Oct. 9, 1951     R. A. BECKWITH     2,570,191
DETACHABLE DRIVING AXLE UNIT
Filed July 13, 1948     3 Sheets-Sheet 1
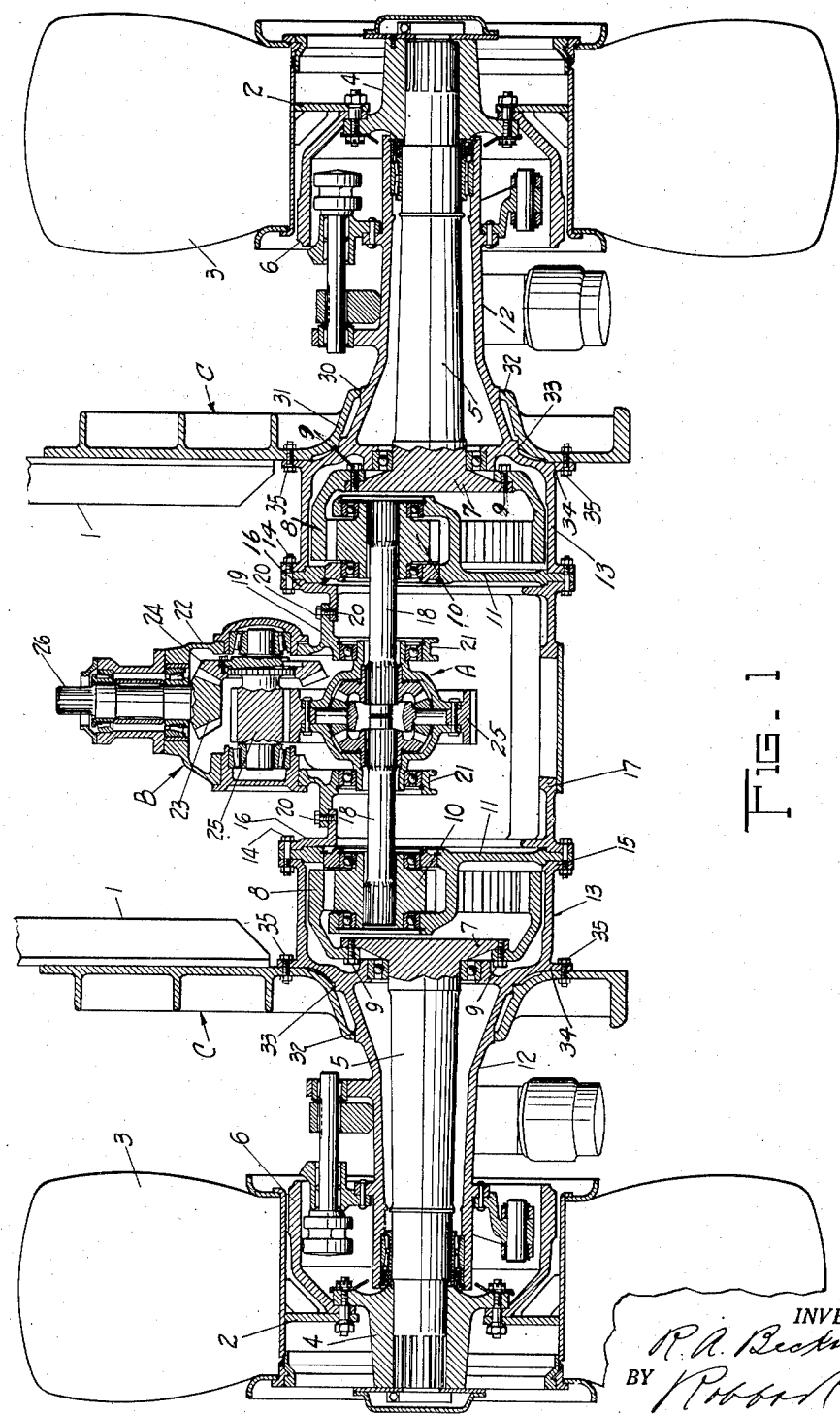
INVENTOR.
R. A. Beckwith
BY
Attorneys Oct. 9, 1951    R. A. BECKWITH    2,570,191
DETACHABLE DRIVING AXLE UNIT
Filed July 13, 1948    3 Sheets-Sheet 2
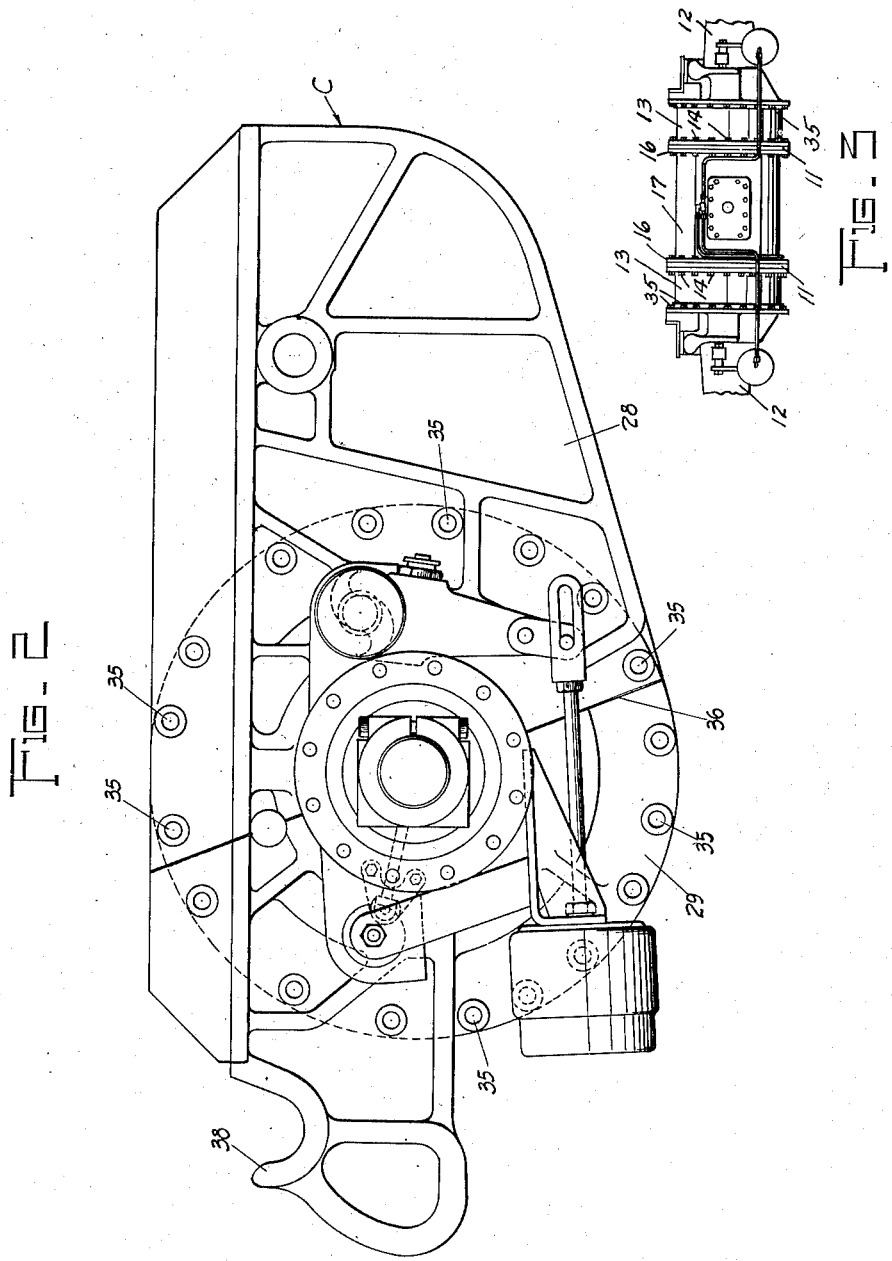
INVENTOR.
R. A. Beckwith
BY Robb & Robb
Attorneys

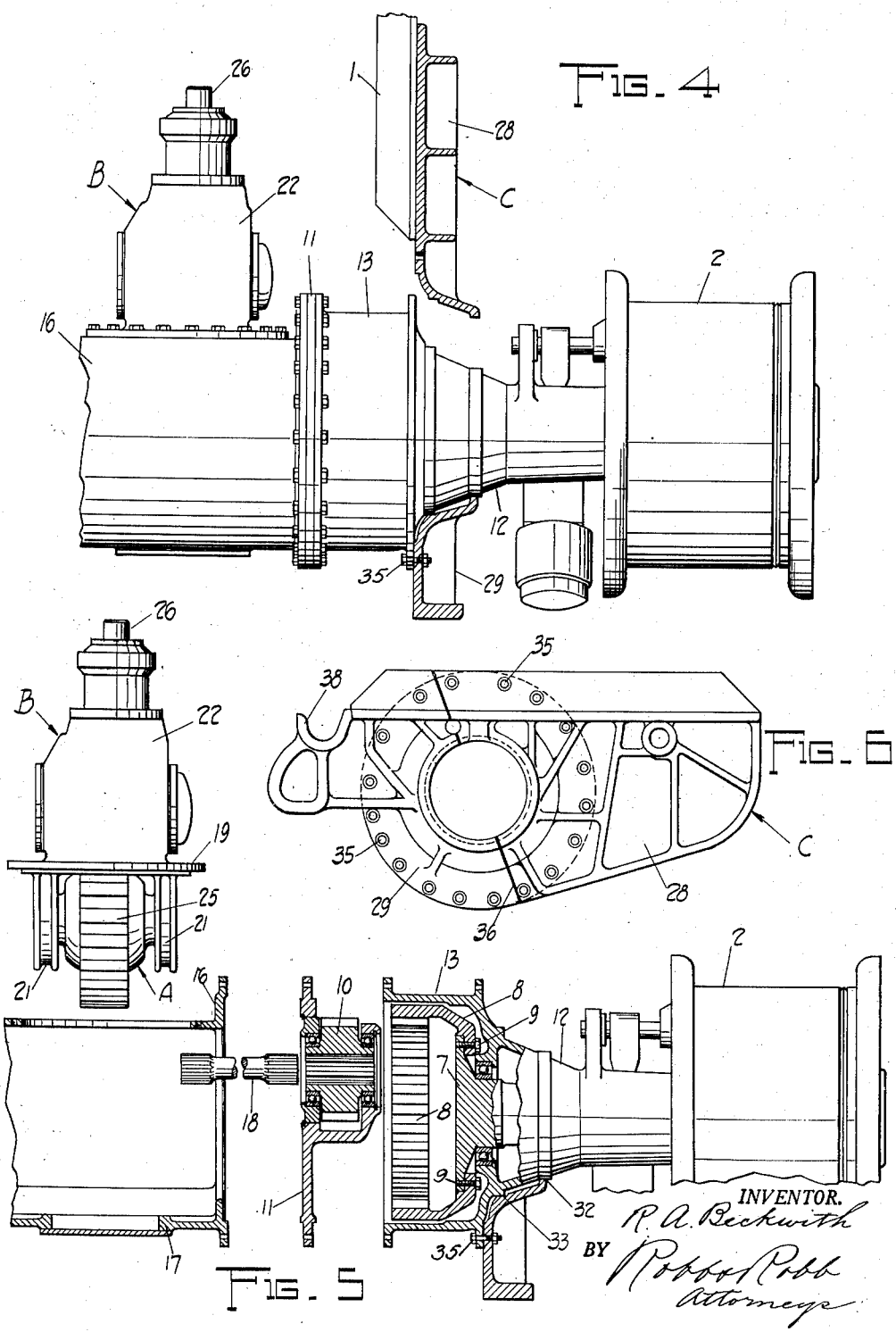

Patented Oct. 9, 1951

2,570,191

UNITED STATES PATENT OFFICE 2,570,191

DETACHABLE DRIVING AXLE UNIT

Raymond A. Beckwith, Milwaukee, Wis., assignor to Koehring Company, Milwaukee, Wis., a corporation Application July 13, 1948, Serial No. 38,372

6 Claims. (Cl. 180—75)

My present invention embodies certain novel improvements in mounting means for axle driving units, in relation to the frame or chassis of a vehicle or machine, with which such units are commonly connected. In carrying out my invention I deal with the problem involved in the separation of the driving unit embodying the driving axles for the associated wheels, from the vehicle frame for purposes of quick dis-assembly of the parts of the unit as when repairs or replacements are required.

With the foregoing in view I have so designed the axle unit of my invention that it is primarily attached as a unit to the frame or chassis of the vehicle or machine by means of sectional brackets, the sections of which may be separated in order to withdraw the axle unit as an entirety from the frame along with the driving shafts and the differential unit associated with the latter, after which it is possible, by reason of the method of assembling the parts of my axle unit, to then separate the various elements of which the latter is comprised.

The construction of the mounting means for my axle unit is relatively simple and renders the operation of detachment of the unit from the frame and disassembly a comparatively simple one to perform.

Still another object of my invention, had in view in the development thereof, has been to construct the axle unit in respect to the arrangement of the separate axles for the driving wheels such that certain gear reduction units are mounted in the axle housings for direct driving by the differential gear unit driven by the drive shaft of the vehicle or machine, whereby I am enabled to employ a much smaller differential gear unit than would be otherwise required for the purposes of my invention.

My invention involves other details of construction, in conjunction with the features above set forth, and a preferred embodiment of the invention is illustrated in the accompanying drawings, in which:

Figure 1 is a substantially horizontal sectional view through the rear portion of a vehicle or machine frame or chassis equipped with a rear axle driving unit, in this instance, operated by the usual longitudinal driving shaft, the axle driving unit embodying my invention.

Figure 2 is a view in side elevation showing more particularly the construction of one of the side brackets attached to a side of the frame, which bracket is of sectional construction, the view taken as when the wheel and brake drum associated with the machine adjacent to said bracket has been removed, and looking toward the side of the frame.

Figure 3 is a small view looking toward the axle unit from the rear of the vehicle, the two axle housings being broken away at points outside and laterally of the frame of the vehicle.

Figure 4 is a combined top plan and sectional view, of a sort of exploded nature, illustrating the manner in which my rear axle unit may be pulled rearwardly along with the torque driving shaft and the reduction gear unit and differential gear unit to separate the rear axle assembly from the chassis or frame of the vehicle, the view showing only one-half or a little more than one half of the axle unit since the omitted portion is merely duplicative of that disclosed by the illustration.

Figure 5 is a view somewhat similar to Figure 4 in that the arrangement of the parts is intended to be exploded, and Figure 5 shows how the axle housing has been displaced longitudinally to separate the same from the gear reduction pinion bearing and supporting plate and from the differential housing, enabling the disengagement of the short driving shaft for the reduction gear pinion from the differential gear housing, whereupon the driving shaft and its gear reduction unit may be moved forwardly to separate them from the differential gear housing and the other parts of the axle assembly. This view also only shows the right driving axle unit features, the left of such features being duplicated merely and being fully revealed by Figure 1.

Figure 6 is a side view of the sectional brackets previously referred to, and one of which is mounted at each side of the frame for supporting the axle housing and connecting the latter to the frame.

I first refer to Figure 1 of my drawings to give a general disclosure of the main features of the assembly of units and driving wheels operated by the rear axle, or other axle members shown, all the parts in this view being in their operative used positions. Figure 1 is really a view of a rear axle unit suitable for machines or power driven vehicles of many different types. In this type of construction there is utilized the customary automobile or equivalent frame or chassis, the sides of which are designated at 1 and the rear ends only of which are shown. The driving wheels are designated at 2 and may be rubber equipped with the tires 3 after the usual manner. The wheels 2 have a common form of hub 4 and each hub 4 is splined or otherwise fixed to the adjacent driving axle 5, a suitable brake drum 6 for each wheel 2 being supplied with any common type of brake operating mechanism, which forms no particular feature of the present invention.

Each driving axle 5 is formed at its inner end with a drive flange or head 7, to which is bolted the outer portion of a ring gear 8, the bolt connections being designated 9.

The ring gear 8 is internally toothed, and its teeth mesh with a driving pinion 10, the gears 8 and 10 forming a reduction gear unit in an obvious manner. The gear 10 is supported by suitable bearings in the pinion supporting and bearing plate 11.

Each of the driving axles 5 is mounted in an axle housing 12 which is adapted to carry certain members of the brake devices, including the brake drum 6 previously referred to. Each axle housing 12 tapers toward its outer end and houses therein the outer portion of the associated axle 5, the inner end of such housing 12 being considerably enlarged to provide an integral gear reduction housing 13 which surrounds and houses the gear reduction unit comprising the pinion 10 and the ring gear 8, the pinion 10 supported on the supporting and bearing plate 11. The plate 11 is circular in form, and, adjacent to its periphery, is provided with suitable openings through which bolts 14 pass for connecting an annular flange 15 on the inner end of the gear housing 13 with the plate 11 and with a similar annular flange 16 which forms a part of the differential gear housing 17 which is located between the two driving axles 5 of the complete axle unit. It may be noted that each plate 11 for each of the driving axle members 5, and forming a supporting member of the reduction pinion 10, acts to a certain extent as a partition member intermediate the gear reduction housing 13 and the differential gear unit housing 17.

I have described above completely the parts of the rear axle unit by which the associated wheel 3 is driven, which parts are located at one side of the differential gear unit A which is seen best in Figure 1. It will be understood that the said driving elements are duplicated at the opposite side of the machine, so that my description as applying to one set of said driving elements equally applies to the parts similarly numbered at the opposite side of the machine. The two sets of elements drive the two driving wheels 3 previously referred to.

For the driving of the gear reduction unit from the differential A as the latter is generally designated in Figure 1, the said gear unit A is equipped with the oppositely extending short drive shafts 18 fixed to the laterally spaced bevel gears thereof, and each of said shafts 18 is connected with one of the gear reduction unit pinions 10 for carrying the drive from the differential unit A to the drive axle 5.

The differential gear unit A is largely supported by means of a plate 19 attached to the front side of the housing 17 by means of bolts 20 for enabling the detachment of said plate 19. The plate 19 carries the supporting bearings for the inner adjacent ends of the shafts 18, said bearings being provided upon circular arms 21. The plate 19 is really a flange plate carried by the rear end of a reduction gear housing 22 which projects forwardly from the differential gear housing 17 and is carried by the latter through the attachment bolts 20 securing the plate member 19 to the housing 17. The housing 22 houses the bevel gears 23 and 24 by which the differential driving pinion 25 in the reduction gear housing 22 is driven. The differential A and the reduction gear unit which is generally designated at B in Figure 1, are largely conventional, with the exception that, according to the design of my invention, the differential unit A can be made much smaller than is customary to be used, or necessarily required, owing to the fact that I employ the reduction gear unit including the gears 8 and 10 operated by each of the short drive shafts 18 that lead from opposite sides of the differential gear unit and directly connect with the side bevel gears of the latter.

Were it not for the provision of the reduction gear units including each pair of gears 8 and 10, generally speaking, it would be necessary for me to build the differential gear unit A at least twice the size of that which is illustrated in Figure 1, relatively speaking.

I note that the bevel gear 23 previously referred to as within the gear housing 22 is carried by the usual driving shaft 26 commonly employed on automotive or power driven vehicles for carrying the driving torque of the engine back to the rear axle driving means, though such shaft could, of course, be employed for driving front driving axles as well by the employment of any customary type of power take-off.

I now refer to the mounting means by which the rear driving axle unit above described is supported and connected with the frame of the vehicle, the side members of which are designated 1 and shown in Figure 1. Carried by each of the frame members 1 at its rear extremity is a bracket generally designated at C, said bracket comprising a front section 28 and a rear section 29. Each of the brackets C is provided with a transverse opening 30 through which the adjacent axle housing 12 passes, the rear central portion of the bracket C being deflected laterally as at 31 to provide annular bearing seat portions 32 and 33 snugly fitting around the outwardly tapering portion of the associated housing 12 adjacent to the outer side of the gear reduction housing 13 which is integral with such housing 12. In the above manner the axle housings 12, including the housing portions 13, are rigidly supported in appropriate bearing relation with regard to the brackets C at the opposite sides of the vehicle. The gear reduction housings 13 each has an annular flange near its outer portion, designated 34, bolted to the associated bracket C by means of the bolts 35 which are readily removable. Now each bracket C is a casting of sectional construction, as seen best in Figure 6. The rear section 29 is detachable from the front section 28, as previously referred to in setting forth the bracket structure, on a diagonal line indicated at 36 in Figures 2 and 6. The above construction of the brackets C is of high importance in obtaining the proper functioning of my driving axle unit, as respects its removability and capability of being quickly disassembled, in regard to the frame parts 1.

It may be noted that, practically speaking, the rigid and substantial connection of the sections 28 and 29 of each bracket C is accomplished by the use of the bolts 35 which connect the associated reduction gear casing 13 with the rear section 29 and the front section 28 of each bracket C. It will be obvious therefore that if this connection between the bracket sections 28 and 29 established by means of the housing 13 is broken, even while the rear sections 29 of the two brackets C are retained connected to the housings 12, the said housings and certain other parts, to be later described, may be pulled rearwardly as soon as the gear housings 13 are detached from the front sections 28 of said bracket C.

For an understanding of how a rear driving axle unit such as above described may be detached from the vehicle and quickly disassembled, I refer particularly to Figures 4 and 5 of my drawings for describing such operation.

It will be assumed that the various parts of the construction set forth are in the positions of Figure 1 to start with, and for some reason or other in the need for repair or replacement of housed gears, shafts, or the like, it is required that the rear axle assembly be taken down. To accomplish the foregoing, the operator will first remove all of the bolts 35 that connect the axle housing members 12 to the front sections 28 of the two brackets C. When this is done, the operator can pull the rear axle assembly rearwardly along with the rear end of the drive shaft 26 and the gear housing 22 and the assembled differential gear unit after the manner illustrated in Figure 4, where the rear bracket section of one of the brackets C is shown as having been separated from the front bracket section by such rearward pulling movement of the entire rear wheel unit. Once the rear wheel unit is thus separated from the frame or chassis 1, the next thing for the operator to do is to remove the bolts 14 to disconnect the pinion supporting plates 11, the housing 17, and the reduction gear housings 13, enabling the housings 13 to be pulled laterally from the flanges 16 of the housing 17, as seen partially in Figure 5. In this action the axle housings 12 are separated, being pulled apart along with their axles 5. The foregoing accomplished, the pinion shafts 18 may be disengaged from the housing of differential unit A and by removing bolts 20 the member 19 with the housing 22 may be displaced from the housing 17, as clearly illustrated at the top of Figure 5. The various parts of the rear axle assembly may thus be broken down or apart, so to speak, so that they are readily accessible for repair or replacement.

Of course, in Figures 4 and 5 I only illustrate the detaching phases of the above description in regard to the driving axle and associated closing and connected parts at one side of the machine. Oft-times only the disassembly of this single driving axle and the gearing and housing associated with it will be necessary to be performed, but when the rear axle assembly is separated into the component units after the manner of Figure 4 and Figure 5 illustrations, it will be obvious that each of the axle members forming the rear axle assembly will be disassembled from the associated parts and access had to the gearing by separating up the parts in the manner illustrated by Figure 5 especially.

In my drawings I show at the rear end of the rear section of each bracket C a hook-like bearing support designated 38 but this forms no essential feature of my present invention, though in the construction of machine or vehicle to which my invention has been applied, said bearing support performs a special function in relation to the dumping body that is supported on the vehicle, chassis, or frame 1. Also, it may be noted that in Figure 1 I just show the side portions of the chassis or frame members at the rear end, and these would form a part of an integral solid and strong frame construction such as would be calculated to serve the purpose of the particular type of vehicle with which my invention is used, in respect to the weight and design of the latter.

So far as I am advised, I do not know of any rear axle unit, or other axle unit of such type, which is mounted upon the frame or chassis of the vehicle in connection with which it is used, so as to be dismounted or separated therefrom with the facility with which the construction of my invention permits such operation. The reassembly or reapplication of the rear axle unit to the frame is merely a proposition of putting together the various parts by steps just the opposite of those which I have described above as the disassembly operation, and will, of course, therefore, be obvious.

Having thus described my invention, what I claim as new and desire to secure by Letters Patent of the United States, is:

1. In axle driving unit construction of the class described, in combination, a supporting frame, wheel mounting means comprising an axle unit including spaced wheel driving axles, wheels connected to the outer ends of said axles, supporting axle housings containing said axles, driving mechanism intermediate the said axles for rotation of the latter including a differential gear unit comprising driving shaft members, one connected to each axle, and a differential gear housing between and detachably connected to the axle housings, means for driving actuation of the differential rear unit, and bearing brackets on the frame, receiving and attaching the axle housings to the frame, each of said brackets including separable sections, one section attached to the frame and detachably connected to the associated axle housing, and the other section attached to the axle housing, so that each axle housing provides a connecting device for the sections of an adjacent bracket.

2. Means as claimed in claim 1, combined with connections detachably connecting the inner ends of the axle housings with the said differential gear housing inwardly of the points where the bearing brackets receive the axle housings, and reduction gear units connecting each driving axle to the differential gear unit including said shaft members detachably connected at one end to a gear of the differential unit, and reduction gearing connected detachably to the other end of each shaft member and to an adjacent driving axle, each axle housing comprising a reduction gear housing enclosing the reduction gearing associated with its driving axle, said reduction gearing including a reduction pinion, and a bearing and supporting plate for said pinion held in place by the detachable connections between the differential gear housing and an associated axle housing.

3. In axle driving unit construction of the class described, in combination, a supporting frame, wheel mounting means comprising an axle unit including spaced wheel driving axles, wheels connected to the outer ends of said axles, supporting axle housings containing said axles, driving mechanism intermediate the said axles for rotation of the latter and including a propeller shaft drivingly geared to the axles, and bearing supports for the axle housings secured thereto and comprising parts detachably connecting said housings to the frame to permit bodily rearward displacement of the axle housings from the frame, and parts detachably connecting portions of said bearing supports and the frame locking the housings and frame in mutually reinforcing relation.

4. In axle driving unit construction of the class described, in combination, a supporting frame, wheel mounting means comprising an axle unit including spaced wheel driving axles, wheels connected to the outer ends of said axles, supporting axle housings containing said axles, driving mechanism intermediate the said axles for rotation of the latter and including a propeller shaft drivingly geared to the axles, and bearing supports for the axle housings comprising parts detachably connecting said housings to the frame to permit bodily rearward displacement of the axle housings from the frame, and parts detachably connecting portions of said bearing supports and the frame, said bearing supports being each disposed intermediate the ends of an adjacent axle housing, and a housing detachably connected at opposite ends to the inner ends of the axle housings.

5. In axle driving unit construction of the class described, in combination, a supporting frame, wheel mounting means comprising an axle unit including spaced wheel driving axles, wheels connected to the outer ends of said axles, supporting axle housings containing said axles, driving mechanism intermediate the said axles for rotation of the latter and including a propeller shaft drivingly geared to the axles, bearing supports for the axle housings, each bearing support comprising a bracket composed of a section affixed to the frame and to an adjacent axle housing, and a second section detachably connected relative to and adjacent said first section and secured to said adjacent axle housing, said second section being removable to release the axle assembly from the frame.

6. In combination, a frame composed of spaced side members, driving wheels at opposite sides of the frame, supporting axle housings including one secured intermediate its ends to each side of the frame, driving axles including one in each axle housing connected at its outer end to an adjacent one of the wheels, a differential gear unit between said axle shafts and comprising a differential gear housing detachably connected at its opposite ends to the inner ends of the axle housings to reinforce and connect the sides of the frame together, detachable connections between the axle housings and the frame sides enabling removal of either wheel and its associated housing, or both wheels and housings as a complete unit, the said axle housings each provided with a reduction gear housing at the inner ends thereof, an internally toothed reduction gear on the inner end of each driving axle and in said reduction gear housing, a spur reduction gear working in each of said internally toothed reduction gears, a reduction gear shaft at each side of the differential gear housing and removable at its inner end from said housing and secured at its outer end to the adjacent spur reduction gear, a detachable bearing member between each axle housing and the differential gear housing and supporting each of said gear reduction shafts, removable means securing each bearing member rigidly to the adjacent end of the differential gear housing and the axle housing disposed outwardly thereof, and a propeller shaft drivingly connected to the gear members of the differential gear unit.

RAYMOND A. BECKWITH.

REFERENCES CITED

The following references are of record in the file of this patent:

UNITED STATES PATENTS

| Number | Name | Date |
| --- | --- | --- |
| 1,349,249 | Alden | Aug. 10, 1920 |
| 1,744,516 | Whitacre | Jan. 21, 1930 |
| 2,073,613 | Frudden et al. | Mar. 16, 1937 |
| 2,095,344 | Nelson | Oct. 12, 1937 |
| 2,216,697 | Vossenberg | Oct. 1, 1940 |
| 2,345,351 | Maxon et al. | Mar. 28, 1944 |
| 2,349,940 | Craig | May 30, 1944 |
| 2,352,086 | Eberhard | June 20, 1944 |
| 2,377,574 | Rauch | June 5, 1945 |
| 2,394,119 | Tomik | Feb. 5, 1946 |

FOREIGN PATENTS

| Number | Country | Date |
| --- | --- | --- |
| 383,037 | France | Dec. 26, 1907 |